(12) United States Patent
McGrath et al.

(10) Patent No.: US 6,604,187 B1
(45) Date of Patent: Aug. 5, 2003

(54) PROVIDING GLOBAL TRANSLATIONS WITH ADDRESS SPACE NUMBERS

(75) Inventors: Kevin J. McGrath, Los Gatos, CA (US); Stephan G. Meier, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 291 days.

(21) Appl. No.: 09/596,636

(22) Filed: Jun. 19, 2000

(51) Int. Cl.[7] ............................................. G06F 12/08
(52) U.S. Cl. ...................................................... 711/209
(58) Field of Search ................................. 711/202, 205, 711/206, 207, 209

(56) References Cited

U.S. PATENT DOCUMENTS

| | | | | |
|---|---|---|---|---|
| 4,471,430 A | * | 9/1984 | Bowden et al. | 364/200 |
| 5,226,133 A | * | 7/1993 | Taylor et al. | 395/400 |
| 5,325,507 A | * | 6/1994 | Freitas et al. | 395/425 |
| 5,564,052 A | * | 10/1996 | Nguyen et al. | 395/800 |
| 5,574,877 A | * | 11/1996 | Dixit et al. | 395/417 |
| 6,263,452 B1 | * | 7/2001 | Jewett et al. | 714/9 |

OTHER PUBLICATIONS

"The IDTR3051, R3052 RISController Hardware User's Manual", Revision 1.4, Jul. 15, 1994, chapters 4–5.*
"The SPARC Architecture Manual," Version 9, Weaver and Germon, SPARC Internation, Inc., Menlo Park, CA, 1994, 6 pages.
"Pentium Pro Family Developer's Manual," vol. 3: Operating System Writer's Guide, Intel, 1996, 3 pages.
"Alpha Architecture Handbook," Version 4, Compaq Computer Corp., Order No. EC–QD2KC–TE, Oct. 1998, 6 pages.
"Alpha 21164 Microprocessor Hardware Reference Manual," Compaq Computer Corp., Order No. EC–QP99C–TE, Dec. 1998, 15 pages.
"Alpha Architecture Manual," 3$^{rd}$ Edition, Digital Press, 1998, 10 pages.

* cited by examiner

Primary Examiner—Kevin L. Ellis
(74) Attorney, Agent, or Firm—Lawrence L Merkel; Meyertons, Hood, Kivlin, Kowert & Goetzel, P.C.

(57) ABSTRACT

A processor provides a register for storing an address space number (ASN). Operating system software may assign different ASNs to different processes. The processor may include a TLB to cache translations, and the TLB may record the ASN from the ASN register in a TLB entry being loaded. Thus, translations may be associated with processes through the ASNs. Generally, a TLB hit will be detected in an entry if the virtual address to be translated matches the virtual address tag and the ASN matches the ASN stored in the register. Additionally, the processor may use an indication from the translation table entries to indicate whether or not a translation is global. If a translation is global, then the ASN comparison is not included in detecting a hit in the TLB. Thus, translations which are used by more than one process may not occupy multiple TLB entries. Instead, a hit may be detected on the TLB entry storing the global translation even though the recorded ASN may not match the current ASN. In one embodiment, if ASNs are disabled, the TLB may be flushed on context switches. However, the indication from the translation table entries used to indicate that the translation is global may be used (when ASNs are disabled) by the TLB to selectively invalidate non-global translations on a context switch while not invalidating global translations.

17 Claims, 8 Drawing Sheets

PROVIDING GLOBAL TRANSLATIONS WITH ADDRESS SPACE NUMBERS

BACKGROUND OF THE INVENTION

1. Field of the Invention

This invention is related to the field of processors and, more particularly, to address translation mechanisms within processors.

2. Description of the Related Art

Processors typically support virtual address translation. Generally, address translation is a process in which a virtual address (generated from one or more address operands of an instruction) is translated to a physical address which identifies a memory location in a memory to which the processor is coupled. Address translation allows for numerous benefits.

For example, by providing address translation, a virtual address space exceeding the actual physical memory space of the computer system may be supported. The application programmer (to which the virtual address space is visible and the physical address space is typically invisible) may be insulated from the different amounts of memory that may be supplied in different computer systems. The operating system on the computer system may allocate physical memory to various virtual addresses, and may store instructions and data for other virtual addresses on a slower backup storage (e.g. disk storage). Generally, a block of contiguous virtual addresses is mapped to a corresponding block of physical addresses by a translation table entry in a translation table maintained by the operating system. The block of contiguous addresses is referred to as a page.

As another example, the translation table entry may include protection information for the page. As the processor translates addresses of memory requests, the processor may verify that the type of request being executed is permitted according to the protection information. If the request is not permitted, the processor may generate an exception instead of completing the request. Thus, the operating system may control the manner in which each process accesses each page.

An additional advantage of virtual addressing may be enjoyed by multitasking operating systems. Various processes which may be concurrently executing within the computer system may produce the same virtual addresses. However, the virtual addresses of one process may be allocated to different physical pages than the same virtual addresses of another process. Thus, the instructions and data belonging to one process may be protected from access and update by another process.

Typically, the operating system maintains one or more translation tables in memory. The translation tables are a predefined data structure including a plurality of translation table entries, each translation table entry storing a translation which maps a page of virtual addresses to a corresponding page of physical addresses. The processor searches the translation tables for a translation for each virtual address generated by the processor. Depending upon the definition of the translation table structure, several memory accesses may be performed prior to finding the correct translation table entry in the translation table.

In order to speed the translation process, most processors implement translation lookaside buffers (TLBs). The TLBs are implemented within the processor and cache translation information from previously used translation table entries. Prior to searching the translation tables in memory for a translation of a virtual address, the processor searches the TLBs. Typically, a portion of the virtual address is compared to virtual address tags stored in the TLB. If a hit in the TLB is detected (i.e. a virtual tag match is detected), the corresponding physical address stored in the TLB is used.

Unfortunately, since the same virtual address may have different translations for different processes, the TLBs typically must be flushed during each process switch (or context switch). If the process which is switched out is switched back in a short time later, the translations corresponding to that process must still be reloaded from memory into the TLB (even though they might not have been deleted if it weren't for the flushing during the context switch). Processor performance may be lost due to the time required to reload the TLB with the translations corresponding to the process. A method for reducing the number of TLB invalidations due to context switches is therefore desired.

SUMMARY OF THE INVENTION

The problems outlined above are in large part solved by a processor as described herein. The processor provides a register for storing an address space number (ASN). Operating system software may assign different ASNs to different processes, and thus the ASN may identify a process. The processor may include a TLB to cache translations, and the TLB may record the ASN from the ASN register in a TLB entry being loaded. Thus, translations may be associated with processes through the ASNs. Generally, a TLB hit will be detected in an entry if the virtual address to be translated matches the virtual address tag and the ASN matches the ASN stored in the register. Accordingly, the TLB need not be invalidated on context switches.

Additionally, the processor may use an indication from the translation table entries to indicate whether or not a translation is global. If a translation is global, then the ASN comparison is not included in detecting a hit in the TLB (and thus determining if the cache translation may be used to translate the virtual address). In other words, the ASN comparison does not affect the detection of a hit on a global translation. Thus, translations which are used by more than one process may not occupy multiple TLB entries. Instead, a hit may be detected on the TLB entry storing the global translation even though the recorded ASN may not match the current ASN. TLB entry usage may thus be more efficient.

In one embodiment, ASNs may be enabled through an enable indication. If ASNs are disabled, the TLB may be flushed on context switches. However, the indication from the translation table entries used to indicate that the translation is global may be used (when ASNs are disabled) by the TLB to selectively invalidate non-global translations on a context switch while not invalidating global translations on the context switch.

Broadly speaking, a processor is contemplated. The processor comprises a first register and a TLB coupled to the first register. The first register is configured to store a first value indicative of a first process being executed by the processor. The TLB includes at least a first entry, wherein the first entry is configured to store at least: (i) a portion of a first virtual address; (ii) a second value indicative of a second process being executed by the processor at a time that the first entry is loaded with the first virtual address; and (iii) a first indication from a translation table entry corresponding to the first virtual address. The TLB is configured to selectively include, dependent upon the first indication, a comparison of the first value to the second value in determining if a second virtual address hits in the first entry.

Additionally, a method is contemplated. A first virtual address is presented to a TLB for translation. The TLB determines if the first virtual address is a hit in a first entry of the TLB. The first entry stores at least: (i) a portion of a second virtual address; (ii) a first value indicative of a first process being executed at a time that the first entry is loaded with the second virtual address; and (iii) a first indication from a translation table entry corresponding to the second virtual address. The determination selectively includes comparing said first value to a second value indicative of a second process being executed during the determination. The selective including is dependent upon the first indication.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
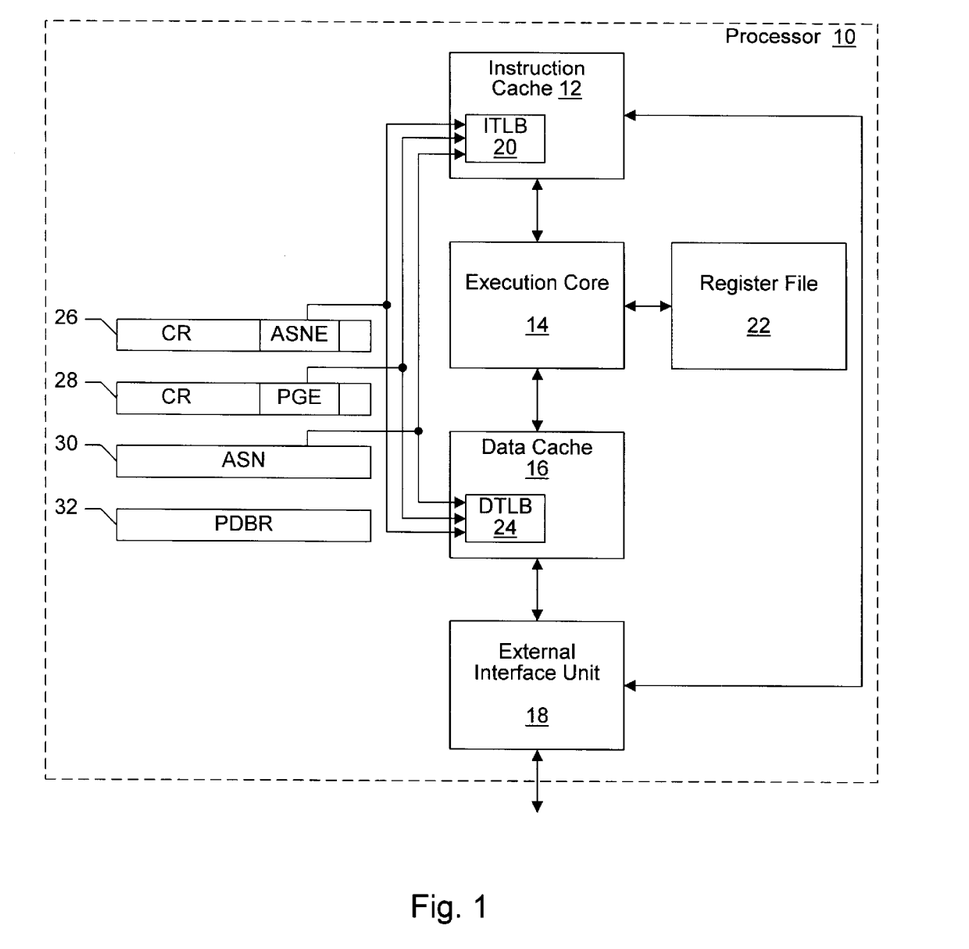
FIG. 1 is a block diagram of one embodiment of a processor.

Turning now to FIG. 1, a block diagram illustrating one embodiment of a processor 10 is shown. Other embodiments are possible and contemplated. In the embodiment of FIG. 1, processor 10 includes an instruction cache 12 (which includes an instruction translation lookaside buffer, or ITLB 20), an execution core 14, a data cache 16 (which includes a data TLB or DTLB 24), an external interface unit 18, a register file 22, and a set of control registers 26–32. Instruction cache 12 is coupled to external interface unit 18 and execution core 14. Execution core 14 is further coupled to register file 22 and data cache 16. Data cache 16 is further coupled to external interface unit 18. External interface unit 18 is further coupled to an external interface. Control registers 26–30 are coupled to ITLB 20 and DTLB 24, and control registers 26–32 may be coupled to execution core 14 (not shown in FIG. 1 for simplicity in the drawing).

Generally speaking, processor 10 is configured to use address space numbers (ASNs) to identify processes to which translations cached in ITLB 20 and/or DTLB 24 belong. ASNs may be implemented by one or both of the TLBs, as desired. The below discussion will refer to TLBs which implement ASNs, unless otherwise noted.

More particularly, ASNs may be used to identify different processes. The operating system may assign different ASNs to different processes and may load the ASN corresponding to a particular process into control register 30 when performing a context switch to the particular process. The TLBs may record the ASN stored in control register 30 in each TLB entry as the entry is filled with a translation. Thus, the translation is associated with the particular process through the ASN. When determining if a translation for a virtual address is stored in the TLB, the TLB may qualify the virtual address comparison to the virtual tags in the TLB with a comparison of the corresponding ASNs recorded in the TLB to the ASN stored in control register 30. A hit on a TLB entry may be detected if the ASN stored in the TLB entry matches the ASN stored in control register 30 and the virtual address matches the virtual tag in the entry. Since translations are associated with processes through the ASNs, the TLB need not be invalidated on context switches since the ASN comparison may prevent a process from using translations for another process. The translations corresponding to a process may still be stored in the TLB the next time that process is activated, and hits may be detected without having to reload the TLB (if the entries weren't overwritten with translations accessed by an intervening process). Performance may thus be improved.

It may be desirable to allow multiple processes to have access to certain translations (global translations). For example, translations related to operating system services may be used by any process. Additionally, several processes may be related to a particular application program and thus may be provided shared access to certain pages. Rather than having multiple entries allocated in the TLB for the same global translation with different ASNs, processor 10 may use an indication from the translation to determine whether or not the ASNs are included in detecting a TLB hit for that translation. Thus, the TLBs may qualify the comparison of ASNs with the value of the indication. If the indication indicates that the ASNs are not included (because the translation is indicated as global by the indication), then a hit may be detected on a TLB entry for a first process even though the TLB entry may have been loaded when a different process is executing. Thus, the global translation is not reloaded into the TLB with the ASN of the first process. Instead, a hit is detected on the previously loaded translation information. Allocating multiple TLB entries to the same global translation may thus be avoided, allowing more efficient use of the TLB. The indication used to determine whether or not ASNs are included in the hit determination is referred to in one embodiment below as the G bit (or global bit). If the G bit is set, then the translation is global and ASNs are not included in the hit determination. If the G bit is clear, the translation is not global ASNs are included in the hit determination. However, other embodiments are possible using different bits.

In one embodiment, the use of ASNs may be optional and may be enabled via an ASN enable indication (ASNE indication) stored in control register 26. If the ASNE indication is in an enabled state, the TLBs may use ASNs as described above. If the ASNE indication is in a disabled state, then ASNs are ignored in the determination of TLB hits. Additionally, if the ASNE indication is in a disabled state, TLB entries may be invalidated during context switches. However, the G bit from each translation may be used when ASNs are disabled to selectively invalidate a TLB entry corresponding to that translation during context switches. If the G bit is set, then the TLB entry is not invalidated and if the G bit is clear, then the TLB entry is invalidated. The G bit may be used to selectively invalidate TLB entries even if the TLB does not implement ASNs.

In one embodiment, the use of the G bit (for either determining if the ASNs are included or for selectively inhibiting TLB invalidation) may be enabled via an enable indication as well (the PGE indication stored in control register 28). If the PGE indication is in a disabled state and the ASNE indication is in an enabled state, ASNs always are included in determine TLB hits. If the PGE indication is in a disabled state and the ASNE indication is in a disabled state, all TLB entries are invalidated during a context switch (i.e. the TLB is flushed). If the PGE indication is in an enabled state and the ASNE indication is in a disabled state, TLB entries are selectively invalidated based on the G bit from each translation. If the PGE indication is in an enabled state and the ANSE indication is in enabled state, the ASNs are selectively included in the TLB hit determination based on the value of the G bit of the corresponding translation.

It is noted that TLB entries are referred to herein as being loaded (or reloaded) from a translation table entry or loaded (or reloaded) with a translation. Loading (or reloading) a TLB entry refers to storing translation information corresponding to the translation into the TLB entry. The translation information may comprise a subset or superset of the translation in the translation table entry, and may include information derived from the translation in the translation table entry and from other information (e.g. the ASN from control register 30).

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the ASNE indication in control register 26 as the ASNE bit, with the enabled state being set and the disabled state being clear. Furthermore, the PGE indication in control register 28 may be referred to herein as the PGE bit, with the enabled state being set and the disabled state being clear. However, other encodings of these indication are contemplated, as set forth above.

Control register 32 is used to store the page directory base address which processor 10 uses, when a TLB miss is detected, to search for a translation corresponding to the virtual address for which the TLB miss is detected. Generally, the page directory base address specifies the base address of the translation table in memory, and the virtual address is used in conjunction with the base address to access translation table entries in the translation table. Different processes may have different translation tables, and thus control register 32 may be updated during a context switch. In one embodiment, update of control register 32 is the event which causes TLB entries to be invalidated when ASNs are not in use (since those TLB entries may have been loaded from the translation table having a different base address than the base address being stored into control register 32). Thus, execution core 14 may signal ITLB 20 and DTLB 24 when an instruction which updates control register 32 is executed, and receipt of the signal may cause the TLB to selectively invalidate entries (if the ASNE bit is clear and the PGE bit is set) or to flush all entries (if the ASNE bit is clear and the PGE bit is clear). If the ASNE bit is set, then no invalidations may be performed in response to the signal.

It is noted that control registers 26–32 may be implemented as architected control registers. Alternatively, one or both of the control registers may be implemented as model specific registers. Furthermore, control registers may be combined if desired.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may include ITLB 20 to provide physical address translations for virtual addresses fetched from instruction cache 12.

Execution core 14 executes the instructions fetched from instruction cache 12. Execution core 14 fetches register operands from register file 22 and updates destination register operands in register file 22. Similarly, execution core 14 fetches memory operands from data cache 16 and updates destination memory locations in data cache 16, subject to the cacheability of the memory operands and hitting in data cache 16. Additionally, execution core 14 may be configured, responsive to executing certain instructions, to update the contents of one or more of control registers 26–32.

Execution core 14 may employ any suitable construction. For example, execution core 14 may be a superpipelined core, a superscalar core, or a combination thereof. Execution core 14 may employ out of order speculative execution or in order execution, according to design choice.

Register file 22 may include the registers specified by the processor architecture employed by processor 10. For example, register file 22 may include 64 bit registers which may be accessed as 64 bit, 32 bit, 16 bit, or 8 bit registers as indicated by the operating mode of processor 10 and any overrides for a particular instruction. In one embodiment, the registers included in register file 22 may include the LEAX, LEBX, LECX, LEDX, LEDI, LESI, LESP, and LEBP registers. Register file 22 may further include the LEIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may include DTLB 24 to provide physical address translations for virtual addresses presented to data cache 16.

External interface unit 18 communicates with portions of the system external to processor 10. External interface unit 18 may communicate cache lines for instruction cache 12 and data cache 16 as described above.

It is noted that processor 10 may include an integrated level 2 (L2) cache, if desired. Furthermore, external interface unit 18 may be configured to communicate with a backside cache in addition to communicating with the system.

Figure 2:
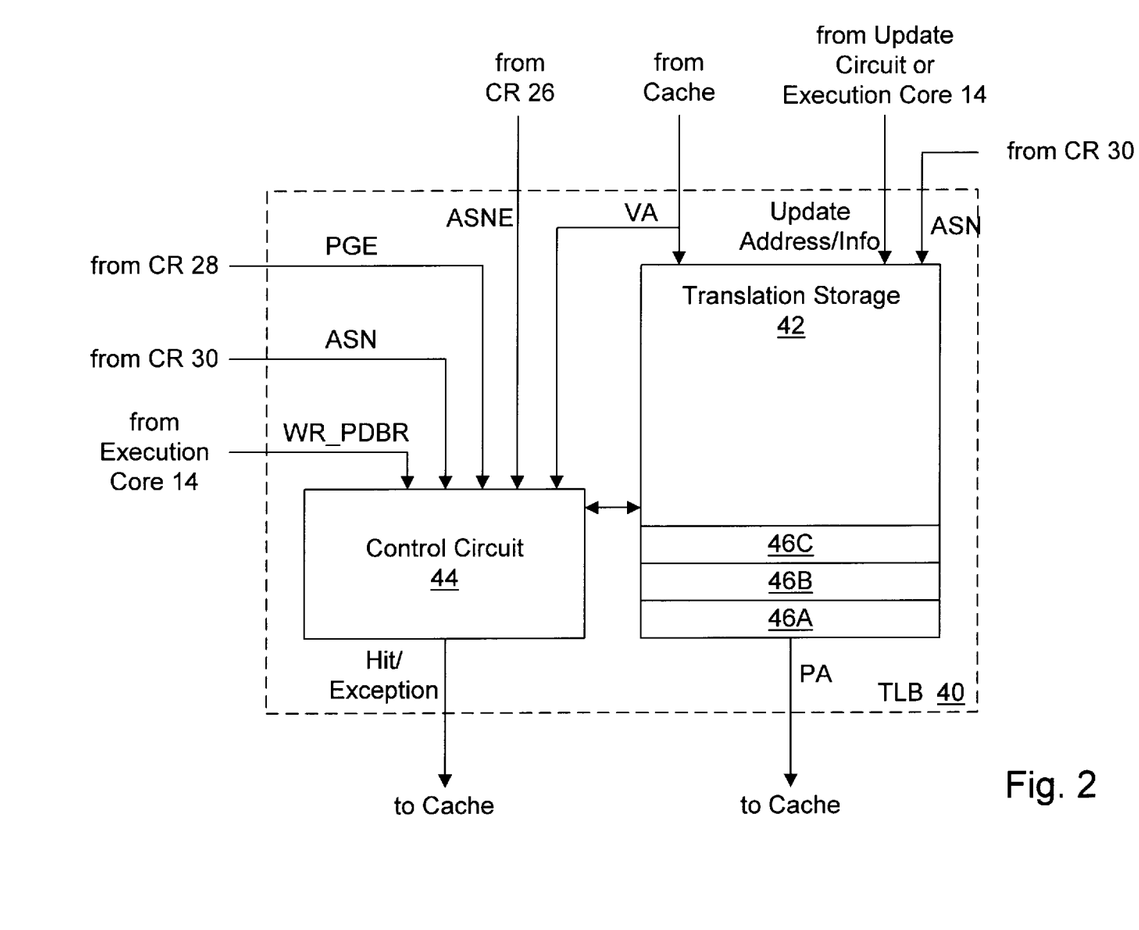
FIG. 2 is a block diagram of one embodiment of a translation lookaside buffer.

Turning now to FIG. 2, a block diagram of one embodiment of a TLB 40 is shown. Other embodiments are possible and contemplated. TLB 40 may be used to implement one or both of ITLB 20 and DTLB 24, depending upon which of the TLBs use ASNs. As illustrated in FIG. 2, TLB 40 includes a translation storage 42 and a control circuit 44. Translation storage 42 is coupled to receive a virtual address (VA) from the cache corresponding to TLB 40 (e.g. data cache 16 if TLB 40 is DTLB 24 and instruction cache 12 if TLB 40 is ITLB 20) and is coupled to receive the ASN from control register 30 and an update address and information (from an update circuit (not shown) or from execution core 14 if microcode is used to load TLB entries). Translation storage 42 is coupled to provide a physical address (PA) to the cache and is further coupled to control circuit 44. Control circuit 44 is coupled to provide hit and exception information to the cache, and is coupled to receive the virtual address from the cache, the ASNE bit from control register 26, the PGE bit from control register 28, the ASN from control register 30, and a WR_PDBR signal from execution core 14.

In response to a virtual address received from the cache, TLB 40 determines whether or not the virtual address is a hit in translation storage 42 and provides the corresponding physical address if a hit is detected. More particularly, the virtual address may be used to select one or more entries in translation storage 42 which may be eligible to store a translation corresponding to the virtual address (depending upon the structure of the translation storage 42). The virtual address is also provided to control circuit 44, which compares at least a portion of the virtual address to a virtual address tag stored in the selected entry (or entries). Additionally, if ASNs are enabled (as indicated by the ASNE bit), control circuit 44 may compare the ASN from register 30 to the ASN stored in the selected entry (or entries). Furthermore, the ASN comparison may be selectively applied to the selected entry (or entries) if the PGE bit is set. If a hit is detected, control circuit 44 may assert a hit signal to the cache. Additionally, if more than one entry is selected from translation storage 42 in response to the virtual address, control circuit 44 may signal translation storage 42 of the entry from which to read the physical address. Translation storage 42 provides the physical address to the cache.

Generally, translation storage 42 is a memory comprising entries. For example, entries 46A–46C are illustrated in FIG. 2, and additional entries may be provided as desired. Each entry 46A–46C is configured to store translation information corresponding to a particular translation. Translation storage 42 may comprise any suitable structure. For example, translation storage 42 may be a direct mapped, set associative, or fully associative memory. In one particular embodiment, translation storage 42 may be a fully associative memory implemented as a content-addressable memory (CAM). For example, the portion of the entry storing virtual address information may be compared to the input virtual address in the CAM. Translation storage 42 may provide a hit signal for each entry based on the CAM of the virtual address to control circuit 42. Additionally, the portion of the entry storing the ASN may be a CAM and translation storage 42 may provide a compare signal for each entry indicating whether or not the stored ASN matches the current ASN from control register 30. In set associative or direct mapped embodiments, a portion of the virtual address may be an index to select an entry (direct mapped) or entries (set associative) which may store translation information for the virtual address. In such an embodiment, the virtual address tag stored in each entry and compared to the input virtual address may exclude the index bits.

In addition to detecting hits for input virtual addresses, control circuit 44 may be configured to handle invalidations of entries in translation storage 42 if an update to control register 32 is detected. Execution core 14 provides a WR_PDBR signal which execution core 14 asserts in response to executing an instruction which updates control register 32. Based on the settings of the ASNE bit and PGE bit, control circuit 14 determines which of the entries to invalidate. If the ASNE bit is set, control circuit 14 does not invalidate any TLB entries (since the ASNs differentiate between translations belonging to various processes). If the ASNE bit is clear and the GPE bit is set, control circuit 44 may invalidate only those TLB entries for which the G bit in the corresponding translation is clear. Finally, if the ASNE bit is clear and the GPE bit is clear, control circuit 44 may invalidate all entries (i.e. flush the TLB).

If a virtual address provided by the cache misses in TLB 40, processor 10 searches the translation tables in memory to find the translation corresponding to the virtual address. If a translation is found, translation storage 42 is updated with the information. The searching of the translation tables and the update may be handled using a variety of mechanisms. For example, hardware (i.e. an update circuit) may be designed which searches the table and provides the update information to translation storage 42. Alternatively, a microcode routine may be executed by execution core 14 to perform the search and provide the update. The update information includes the virtual address which caused the TLB miss and may include a portion or all of the information from the translation as well as any information derived from the translation, if applicable. Additionally, in the present embodiment, the ASN from register 30 is provided (shown separate from the other update information in FIG. 2). Control circuit 44 may select an entry to be updated and indicate the selected entry to translation storage 42. Any suitable replacement strategy may be used, depending upon the structure of translation storage 42.

If control circuit 44 detects a hit in an entry of translation storage 42, control circuit 44 may also examine the other attributes from the translation which are stored in the entry to ensure that the operation being attempted is permitted by the other attributes (e.g. protection information and privilege level information may be part of the other attributes). If the operation is not permitted, control circuit 44 may signal an exception in addition to the hit signal.

It is noted that, although control circuit 44 is shown separate from translation storage 42, a portion of control circuit 44 may be integrated into translation storage 42 (e.g. the comparators for comparing the virtual address and ASNs).

Figure 3:
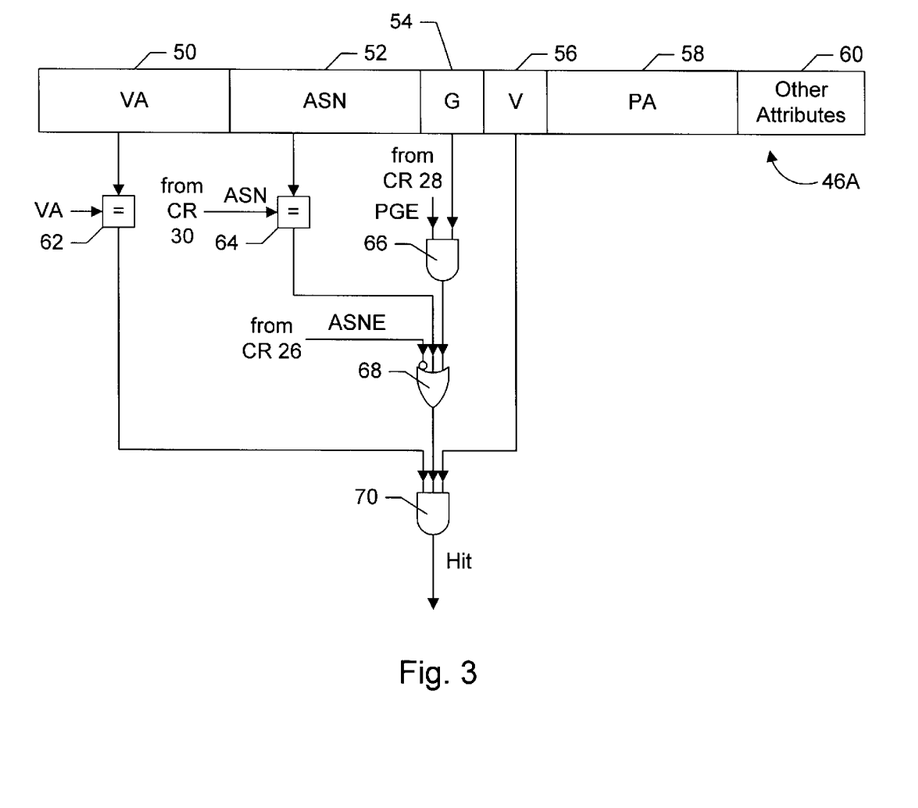
FIG. 3 is a block diagram of one embodiment of a translation lookaside buffer entry and corresponding circuitry for detecting a hit.

Turning next to FIG. 3, a block diagram of one embodiment of a TLB entry 46A and corresponding control circuitry from control circuit 44 for detecting a hit in entry 46A is shown. The circuitry shown in FIG. 3 is exemplary only, and other embodiments may use other circuitry (including Boolean equivalents to the circuitry shown). Furthermore, the circuitry shown may not be dedicated to entry 46A (e.g. in a direct mapped or set associative embodiment of the TLB, eligible entries may be read from translation storage 42 and the circuitry may operate upon the output of translation storage 42. Other embodiments are possible and contemplated.

In the embodiment of FIG. 3, entry 46A includes a virtual address field 50, an ASN field 52, a G bit 54, a valid bit 56, a physical address field 58, and an other attributes field 60. Virtual address field 50 stores at least a portion of the virtual address corresponding to the entry. More particularly, virtual address field 50 may not include the index portion of virtual address if translation storage 42 is a set associative or direct mapped storage. Additionally, the portion of the virtual address which defines an offset within the smallest translation page may not be stored (since the offset portion is not translated). Physical address field 58 stores the corresponding physical address defined for the virtual address according to the corresponding translation. Again, physical address field 58 may not store the offset portion, since the offset portion is provided untranslated from the virtual address. ASN field 52 stores the ASN which was stored in control register 30 when the entry 46A was loaded with the present translation. G bit 54 is the G bit from the translation entry (see, e.g. FIGS. 5 and 6 below). Valid bit 56 indicates whether or not entry 46A is storing valid translation information, and other attributes field 60 stores other attributes from the translation which may be used for protection checking, etc.

The circuitry shown in FIG. 3 includes a comparator 62 coupled to receive the contents of virtual address field 50 and to receive the input virtual address, a comparator 64 coupled to receive the contents of ASN field 52 and to receive the ASN from control register 30, an AND gate 66 coupled to receive the PGE bit from control register 28 and the G bit from entry 46A, an OR gate 68 coupled to receive and invert the ASNE bit from control register 26, to receive the output of comparator 64, and to receive the output of AND gate 66, and an AND gate 70 coupled to receive the output of OR gate 68, the output of comparator 62, and the valid bit from entry 46A. The output of AND gate 70 is the hit signal for entry 46A, and indicates that a hit (asserted) or miss (deasserted) is detected.

Comparator 62 compares the virtual address from field 50 to the input virtual address, and asserts its output signal if the addresses are equal. In one embodiment, various sizes of pages may be supported by processor 10. Thus, virtual address field 50 and the input virtual address to comparator 62 may comprise the page portion of the virtual address (less any index bits, if applicable) for the smallest page size. If the translation is for a larger page size, the address bits within virtual address field 50 and the input virtual address to comparator 62 which are actually offset bits within the larger page may be masked. Alternatively, comparator 62 may be implemented as several comparators comparing the page portion for the largest page size and the remaining portions according to the other supported page sizes. Output signals of the comparators may be masked and combined according to the page size of the translation stored in entry 46A. Other attributes field 46A may include information identifying the page size of the translation.

Comparator 64 compares the ASN from ASN field 52 to the ASN from control register 30, and asserts its output signal if the ASNs are equal. The output signal is an input to OR gate 68.

OR gate 68 determines whether or not the output signal of comparator 64 affects the hit determination. More particularly, the output signal of comparator 64 passes through OR gate 68 if the ASNE bit is set (and thus the inversion of the ASNE bit is clear) and either the PGE bit is clear or the G bit 54 is clear (deasserting the output of AND gate 66). Accordingly, the ASN comparison is selectively included in the hit determination. Viewed in another way, ASN comparison may be selectively masked out of the hit determination.

AND gate 66 provides the enabling function of the PGE bit for G bit 54. If the PGE bit is clear, the G bit is masked off by AND gate 66. If the PGE bit is set, the value of the G bit 54 is passed though AND gate 66.

AND gate 70 generates the hit signal responsive to the output of comparator 62, the output of OR gate 68, and the valid bit 56. Thus, a hit signal is asserted (indicating hit) if comparator 62 detects a virtual address match for the portion being compared, entry 46A is valid, and the output of OR gate 68 is asserted.

It is noted that the circuitry included in FIG. 3 provides for both an ASNE bit and a PGE bit to enable the ASN comparison and the overriding of the comparison via the G bit. Other embodiments may eliminate one or both of the enable indications, and the circuitry in FIG. 3 would be changed accordingly. For example, if the ASNE bit is not used, OR gate 68 may eliminate the input for the ASNE bit. Similarly, if the PGE bit is not used, AND gate 66 may be eliminated and the G bit 54 may be input to OR gate 68.

It is noted that, while the circuitry shown in FIG. 3 is described as being part of control circuit 44, parts of the circuitry may be integrated into translation storage 42. For example, comparators 62 and/or 64 may be integrated into translation storage 42.

Figure 4:
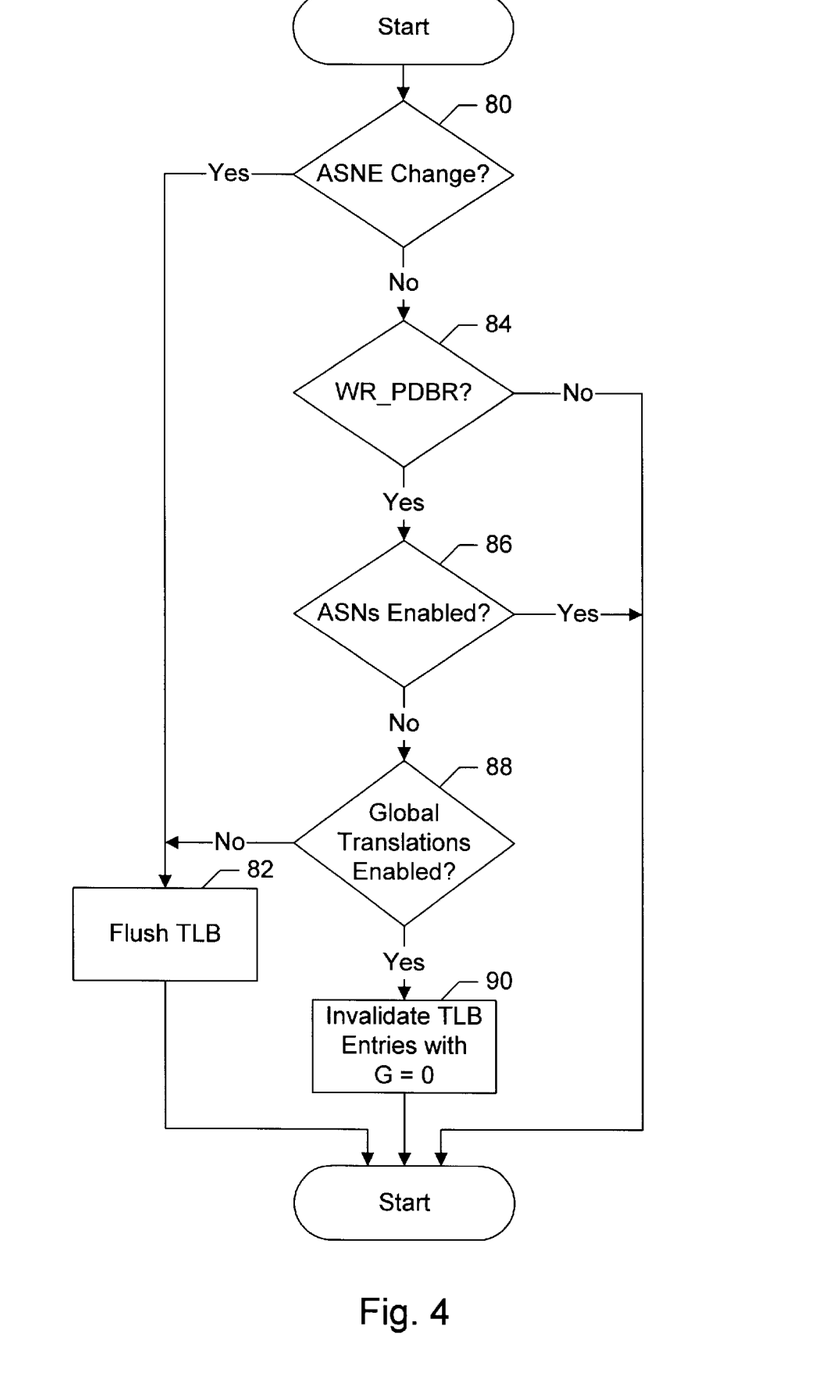
FIG. 4 is a flowchart illustrating operation of one embodiment of a translation lookaside buffer in invalidating entries.

Turning next to FIG. 4, a flowchart is shown illustrating operation of one embodiment of control circuit 44 for invalidating entries in translation storage 42. Other embodiments are possible and contemplated. While the operations shown in FIG. 4 are illustrated in a particular order for ease of understanding, any equivalent order may be used. Furthermore, operations may be performed in parallel by circuitry within control circuit 44.

Control circuit 44 detects a change in the ASNE bit (decision block 80). If a change in the ASNE bit is detected, control circuit 44 flushes the TLB (operation 82). The TLB is flushed in this case because improper translation may occur if not flushed. For example, if the ASNE bit were set (enabling ASNs) and is cleared, the TLB would cease comparing ASNs to qualify TLB hits. However, since the ASNE bit was enabled, it is possible that translations not belonging to the current process are stored in the TLB. Thus, to ensure that translations not belonging to the current process are not used by the current process, the TLB may be flushed. Similarly, if the ASNE bit were cleared and is set, the ASNs of translations currently in the TLB may not have valid ASNs attached to them (since ASNs were not in use).

If the control circuit 44 is not informed of a write to control register 32 (e.g. via an assertion of the WR_PDBR signal—decision block 84), no invalidations may be required. On the other hand, if control circuit 44 is informed of a write to control register 32, control circuit 44 may determine if ASNs are enabled via the ASNE bit (decision block 86). If ASNs are enabled, then again no invalidations may be required. However, if ASNs are not enabled, control circuit 44 may determine if global translations are enabled (e.g. if the GPE bit is set—decision block 88). If global pages are not enabled, control circuit 44 flushes the TLB (operation 82). If global pages are enabled, control circuit 44 selectively invalidates TLB entries for which the G bit is clear (operation 90). In other words, TLB entries for which the G bit is set are inhibited from invalidation.

Figure 5:
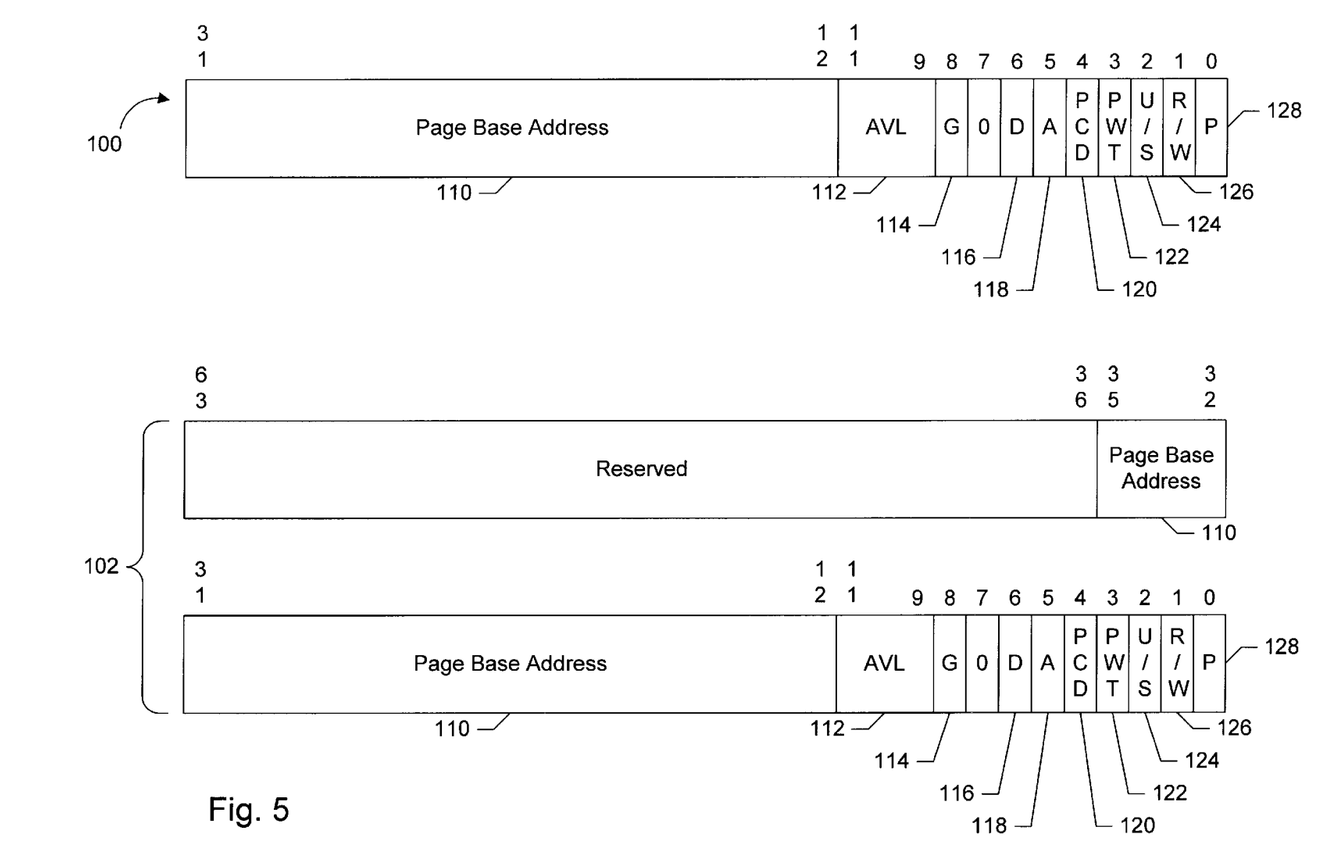
FIG. 5 is a block diagram of one embodiment of a page table entry.
Figure 6:
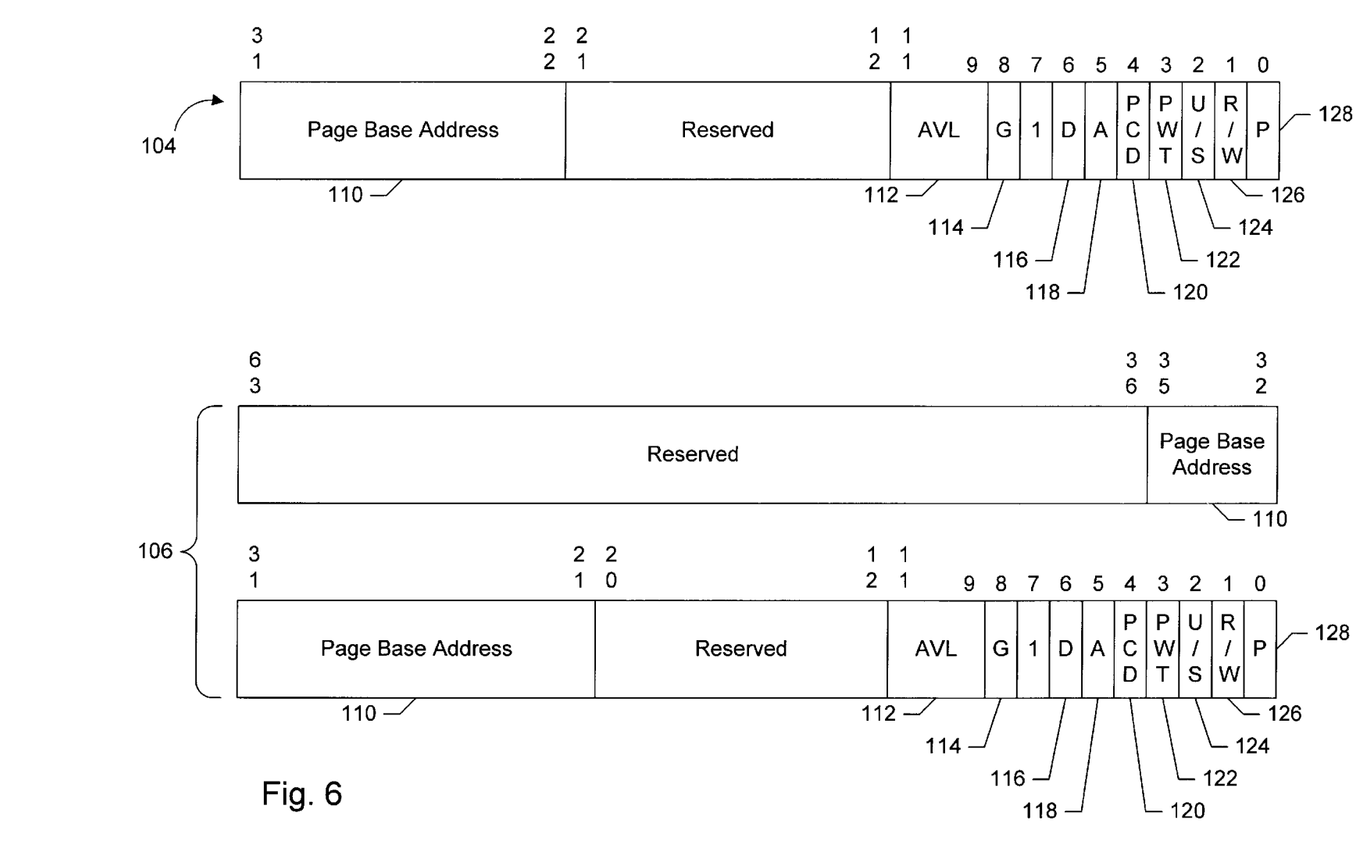
FIG. 6 is a block diagram of one embodiment of a page directory entry.

Turning now to FIGS. 5 and 6, a block diagram of a first embodiment of various translation table entries are shown. Other embodiments are possible and contemplated. The embodiment shown may be used in embodiments of processor 10 designed according to the x86 processor architecture (also known as IA-32). A page table entry 100 used when physical address extension mode is not enabled and a page table entry 102 used when physical address extension mode is enabled are shown in FIG. 5, and a page directory entry 104 used when physical address extension mode is not enabled and page size extension is enabled and a page directory entry 106 used when physical address extension mode is enabled are shown in FIG. 6. Each of the translation table entries 100, 102, 104, and 106 include a page base address field 110, an available field (AVL) 112, a G bit 114, a D bit 116, an A bit 118, a PCD bit 120, a PWT bit 122, a U/S bit 124, a R/W bit 126, and a P bit 128.

Page base address field 110 is the physical address of the page allocated for virtual addresses translated by the corresponding translation 100, 102, and 104. Page table entries 100 and 102 are used for a 4 kilobyte page size, and thus specify the physical address bits exclusive of the least significant 12 bits. Page directory entry 104 is used for a 4 Megabyte page size and thus specifies the physical address bits exclusive of the least significant 22 bits. Page directory entry 104 is used for a 2 Megabyte page size and thus specifies the physical address bits exclusive of the least significant 21 bits. The least significant bits not included in the page base address field 110 are provided untranslated from the virtual address.

Available field 112 is not interpreted by processor 10 and may be used by software (e.g. the operating system) for any purpose. G bit 114 has been described above for both the case of ASNs enabled and ASNs disabled. D bit 116 is set by processor 10 if a byte within the page identified by the page base address field 110 has been modified by processor 10 due to execution of instructions. The A bit 118 is set by processor 10 if the page has been accessed by processor 10. PCD bit 120 indicates whether or not the page is cacheable (e.g. whether or not bytes from the page may be stored in instruction cache 12 or data cache 16). PWT bit 122 indicates whether or not the page is to be treated write-through by data cache 16. U/S bit 124 indicates whether the page is assigned user privilege level or supervisor privilege level. R/W bit 126 indicates whether the page is read-only or read-write. P bit 128 indicates whether or not the translation is valid.

For the embodiment illustrated in FIGS. 5 and 6, access to the translation tables may be as follows: For page table entry 100, the page directory base address stored in control register 32 points to the base address of a page directory which stores page directory entries (similar in form to page table entry 100 except that the G bit 114 is ignored and the D bit 116 is set to zero). A portion of the virtual address is used as an index into the page directory and a page directory entry is selected. The page base address field 110 of the selected page directory entry is the base address of a page table which stores page table entries 100. Another portion of the virtual address is used as an index into the page table to select a corresponding page table entry 100. For page table entry 102, the translation table access is similar to page table entry 100 except that a page directory pointer table which stores page directory pointers is accessed prior to the page directory. The page directory base address stored in control register 32 points to the page directory pointer table, and a portion of the virtual address is used to select a page directory pointer which is the base address of the page directory from which a page directory entry is selected. For page directory entry 104, the page directory base address stored in control register 32 points to the base address of a page directory which stores page directory entries 104. A portion of the virtual address is used as an index into the page directory and a corresponding page directory entry 104 is selected. For page directory entry 106, the translation table access is similar to page directory entry 104, except that the page directory pointer table is used as described above for page table entry 102.

Computer Systems

Figure 7:
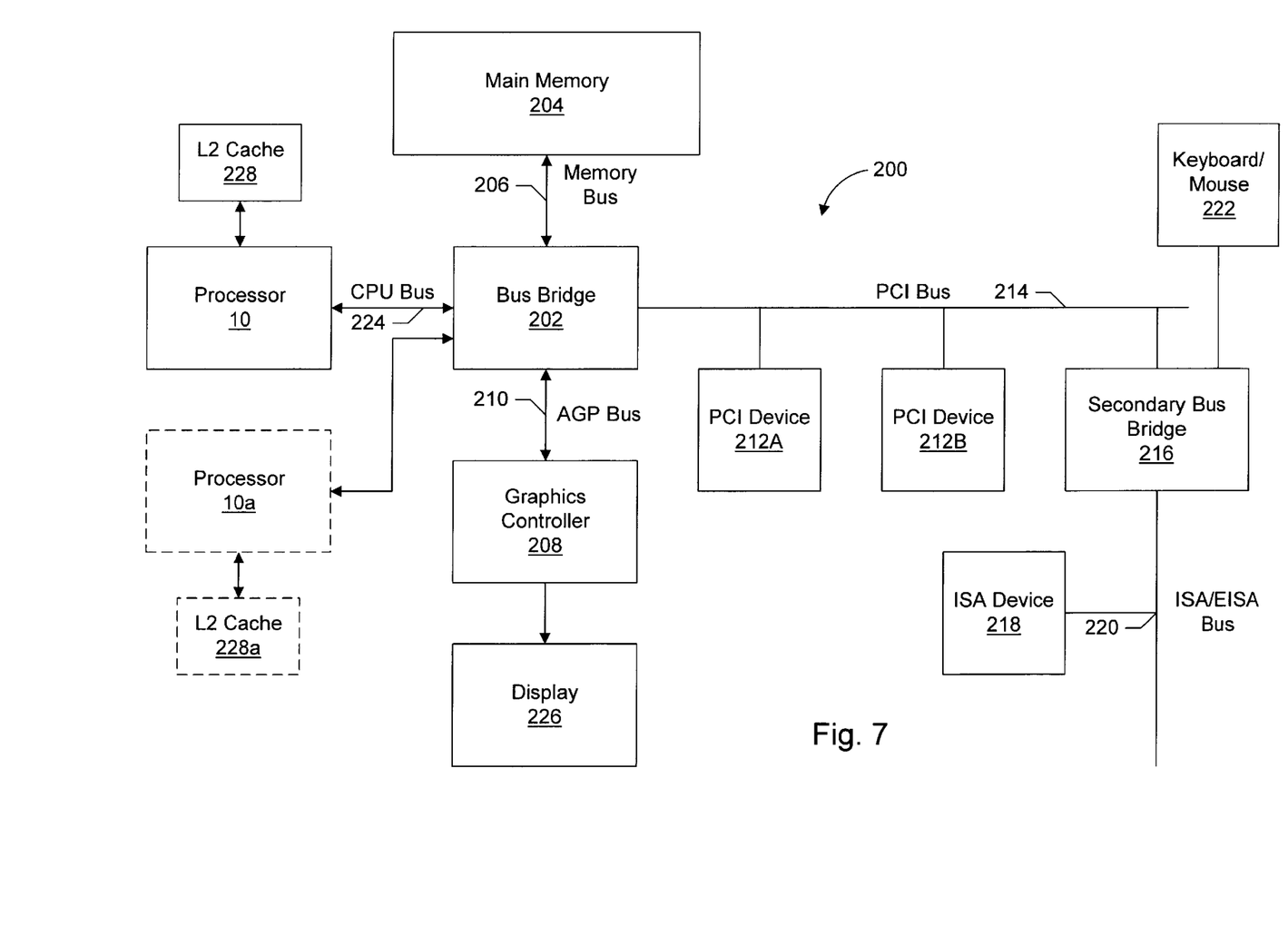
FIG. 7 is a block diagram of a first embodiment of a computer system including the processor shown in FIG. 1.

Turning now to FIG. 7, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 7) or may share CPU bus 224 with processor 10. Furthermore, processor 10a may be coupled to an optional L2 cache 228a similar to L2 cache 228.

Figure 8:
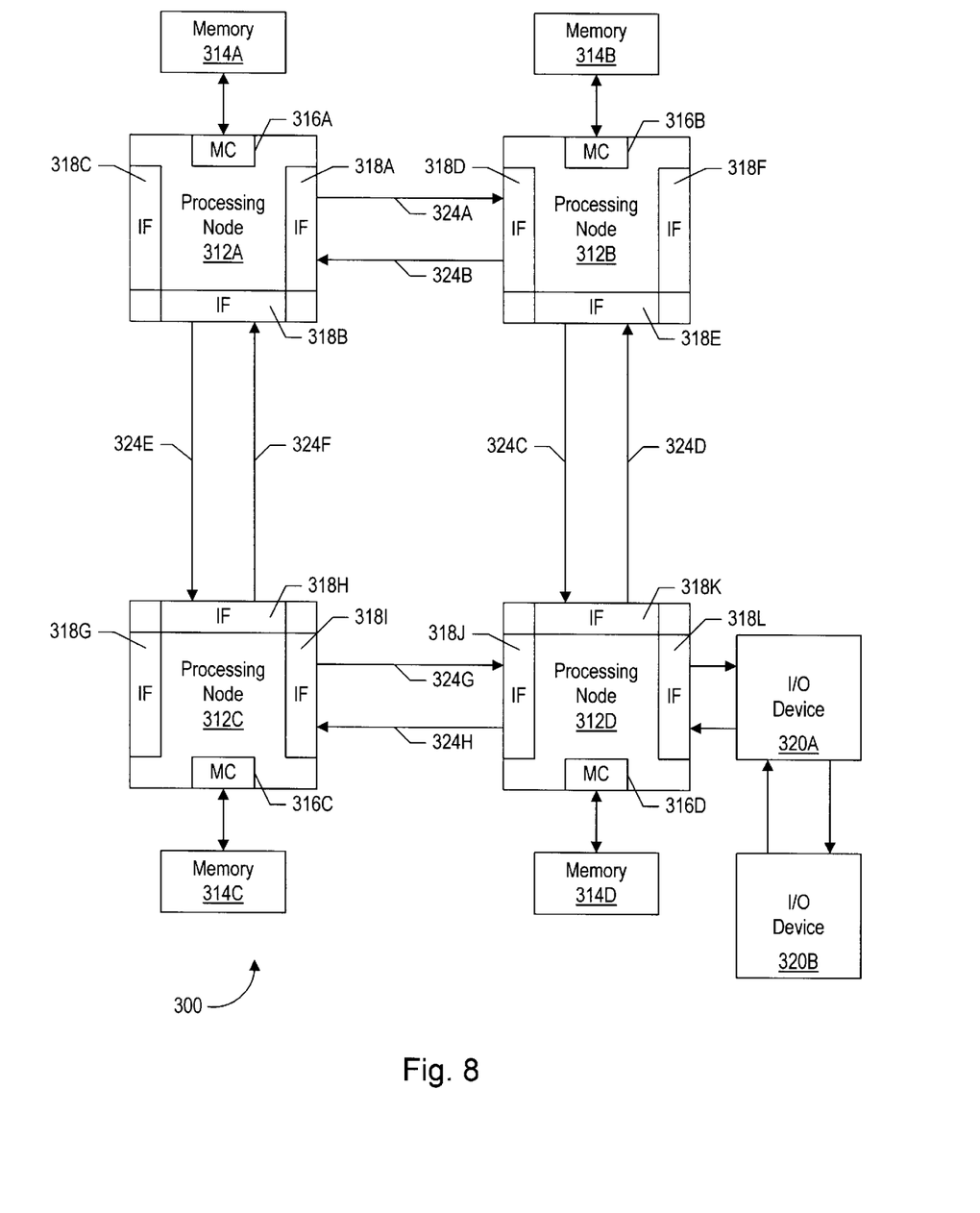
FIG. 8 is a block diagram of a second embodiment of a computer system including the processor shown in FIG. 1.

Turning now to FIG. 8, another embodiment of a computer system 300 is shown. Other embodiments are possible and contemplated. In the embodiment of FIG. 8, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 8. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 8. Any suitable routing algorithm may be used. Other embodiments of computer system 300 may include more or fewer processing nodes then the embodiment shown in FIG. 8.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
    a first register configured to store a first value indicative of a first process being executed by said processor;
    a second register coupled to a translation lookaside buffer (TLB) wherein said second register is configured to store an enable indication indicative of whether or not said first value in said first register is enabled for use; and
    said TLB coupled to said first register, said TLB including at least a first entry, wherein said first entry is configured to store at least: (i) a portion of a first virtual address; (ii) a second value indicative of a second process being executed by said processor at a time that said first entry is loaded with said first virtual address; and (iii) a first indication from a translation table entry corresponding to said first virtual address;
    wherein said TLB is configured to selectively include, dependent upon said first indication and said enable indication is in an enabled state, a comparison of said first value to said second value in determining if a second virtual address hits in said first entry; and
    wherein said TLB is coupled to receive a signal indicating that a base address of a translation table is being updated, and wherein said TLB is configured to selectively invalidate said first entry dependent upon said first indication, said enable indication being in a disabled state, and said signal.

2. The processor as recited in claim 1 wherein said TLB is configured to include said comparison if said enable indication is in said enabled state and said first indication is in a first state.

3. The processor as recited in claim 2 wherein said TLB is configured not to include said comparison if said first indication is in a second state even if said enable indication is in said enabled state.

4. The processor as recited in claim 1 wherein, if said enable indication is in said disabled state, said TLB is configured not to include said comparison.

5. The processor as recited in claim 1 further comprising a third register configured to store said base address of said translation table.

6. The processor as recited in claim 1 further comprising a fourth register coupled to said TLB, wherein said fourth register is configured to store a second enable indication, and wherein said TLB is configured to selectively invalidate said first entry further dependent upon said second enable indication.

7. The processor as recited in claim 6 wherein said TLB is configured to invalidate said first entry if said second enable indication is in said enabled state and said first indication is in a first state.

8. The processor as recited in claim 7 wherein said TLB is configured to invalidate said first entry if said second enable indication is in said disabled state.

9. The processor as recited in claim 7 wherein said TLB is configured not to invalidate said first entry if said second enable indication is in said enabled state and said first indication is in a second state.

10. The processor as recited in claim 1 wherein said TLB is configured to determine that said second virtual address hits in said first entry responsive to: (i) said portion of said first virtual address equaling a corresponding portion of said second virtual address; (ii) said first value equaling said second value; and (iii) said first indication being in a first state.

11. The processor as recited in claim 1 wherein said TLB is configured to determine that said second virtual address hits in said first entry responsive to: (i) said portion of first virtual address equaling said corresponding portion of said second virtual address; and (ii) said first indication being in a second state.

12. A method comprising:
    presenting a first virtual address to a translation lookaside buffer (TLB) for translation;
    determining if said first virtual address is a hit in a first entry of said TLB, said first entry storing at least: (i) a portion of a second virtual address; (ii) a first value indicative of a first process being executed at a time that said first entry is loaded with said second virtual address; and (iii) a first indication from a translation table entry corresponding to said second virtual address, said determining selectively including comparing said first value to a second value indicative of a second process being executed during said determining, and wherein said selectively including is dependent upon said first indication and an enable indication being in an enabled state;
    updating a register storing a base address of a translation table; and
    selectively invalidating said first entry dependent on said first indication if said enable indication is in said disabled state.

13. The method as recited in claim 12 wherein said selectively including comprises including said comparing if said enable indication is in an enabled state and said first indication is in a first state.

14. The method as recited in claim 13 wherein said selectively including comprises excluding said comparing if said first indication is in a second state even if said enable indication is in said enabled state.

15. The method as recited in claim 12 wherein said selectively including comprises excluding said comparing if said enable indication is in a disabled state.

16. The method as recited in claim 12 wherein said determining comprises determining a hit responsive to: (i) said portion of said second virtual address equaling a corresponding portion of said first virtual address; (ii) said first value equaling said second value; and
    (iii) said first indication being in a first state.

17. The method as recited in claim 16 wherein said determining comprises determining said hit responsive to: (i) said portion of said second virtual address equaling said corresponding portion of said first virtual address; and (ii) said first indication being in a second state.

* * * * *

UNITED STATES PATENT AND TRADEMARK OFFICE
CERTIFICATE OF CORRECTION

PATENT NO.    : 6,604,187 B1
DATED         : August 5, 2003
INVENTOR(S)   : McGrath et al.

Page 1 of 1

It is certified that error appears in the above-identified patent and that said Letters Patent is hereby corrected as shown below:

<u>Title page,</u>
Item [*], should read:
-- [*] Notice: Subject to any disclaimer, the term of this patent is extended or adjusted under 35 U.S.C 154(b) by 411 days. --

Signed and Sealed this

Twenty-eighth Day of October, 2003

JAMES E. ROGAN
*Director of the United States Patent and Trademark Office*